United States Patent Office 2,759,456
Patented Aug. 21, 1956

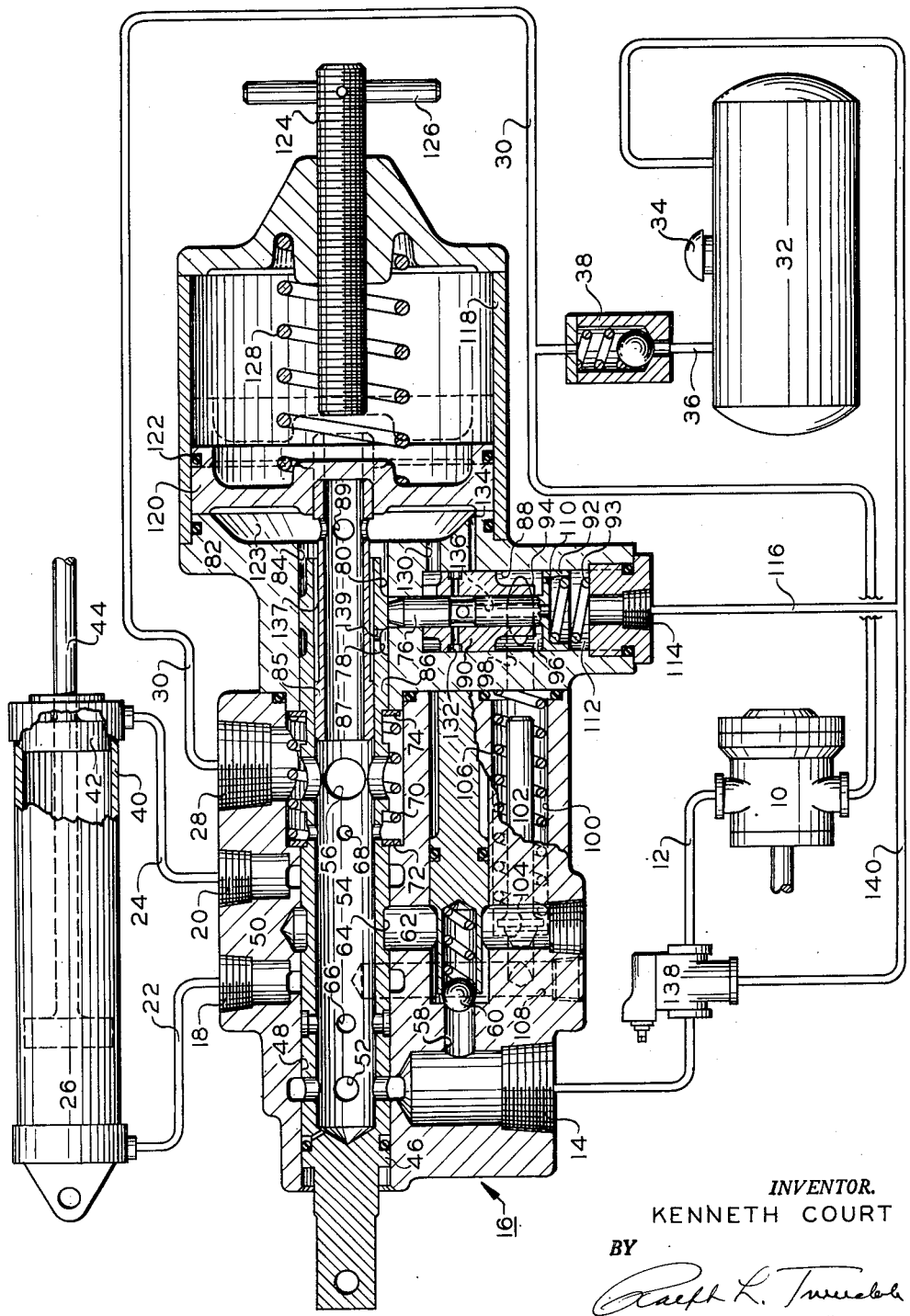

2,759,456

POWER TRANSMISSION

Kenneth Court, Detroit, Mich., assignor to Vickers Incorporated, Detroit, Mich., a corporation of Michigan Application April 12, 1954, Serial No. 422,539

8 Claims. (Cl. 121—38)

This invention relates to power transmissions, and is particularly applicable to those of the type comprising two or more fluid pressure energy translating devices, one of which may function as a pump and another as a fluid motor.

The invention is generally concerned with hydraulic power transmission systems for driving a load device to a preselected position and is particularly concerned with a transmission utilizing a double acting fluid motor for driving the load device and wherein the fluid motor is automatically stopped when the load device has reached a preselected position.

Transmissions of this type are particularly adapted for tractors in the agricultural field for raising and lowering working implements such as discs or plows. It is important in operating farming implements of the type recited that they may be remotely controlled from the tractor seat and that the depth of ground penetration of the implement be accurately controlled and be adjustable as to depth penetration. It is very convenient that the adjustment may be made from the tractor seat, and important that the farming implement may be returned to the preselected depth after raising rather than to leave the same to trial and error methods.

It is therefore an object of this invention to provide an improved hydraulic power transmission system for driving a load device to a preselected position.

It is another object of this invention to provide in a hydraulic power transmission system having a double acting fluid motor for driving a load device, means for automatically stopping the motor at a preselected position of its stroke and also for easily adjusting the stroke of the motor at will.

It is a further object of this invention to provide a hydraulic power transmission system of the type and for the purposes recited which is economical in cost, that can be accurately controlled, and which will perform efficiently over a long and useful life.

Further objects and advantages of the present invention will be apparent from the following description, reference being had to the accompanying drawing wherein a preferred form of the present invention is clearly shown.

In the drawing the single figure is a diagrammatic view of a hydraulic power transmission system incorporating a preferred form of the present invention.

There is shown a pump 10 which may be driven by a prime mover, not shown, such as the power take-off of a tractor, and having a pressure delivery conduit 12 connected thereto which leads to a pressure port 14 of a directional control valve 16. Two motor ports 18 and 20 of the valve 16 are respectively connected by conduits 22 and 24 to the head and rod ends of a fluid motor 26. A return port 28 of the same valve is connected by a return conduit 30 to the inlet side of the pump 10, thus completing a closed circuit interconnecting the pump 10 and motor 26 under the control of valve 16. Make-up fluid for the circuit is provided in a fluid reservoir 32 having a filler cap 34 and which is connected to the return line 30 by a conduit 36 having a check valve 38 incorporated therein which permits make-up fluid to enter the closed circuit but prevents fluid from the return line entering the reservoir. The fluid motor 26 is of the double acting, differential displacement type comprising a cylinder 40 having a fluid operating piston 42 reciprocally mounted therein associated with which is a piston rod 44 which extends from the cylinder for the purpose of driving a load device such as a tractor plow.

The several ports of the valve 16 are controlled by a valve spool 46 reciprocally mounted in a bore 48 of a body 50 and which extends from the body for manual operation thereof. The valve spool is provided with a plurality of transverse ports 52 which, in the position of the spool shown, connects the pressure ports 14 through a hollow spool portion 54 to a plurality of transverse ports 56 which open to the return port 28. The displacement from the pump 10 is thus unloaded or recirculated directly back to the inlet of the pump at negligible pressure while the motor ports 18 and 20 are blocked by the valve spool 46 from communication with each other and from communication with the pressure and return ports 14 and 28. When the valve spool 46 is shifted to opposite sides of the neutral position shown, the transverse ports 52 move out of communication with the pressure port 14 and are thus blocked from communication with the return port 28. Pressure fluid from the pump 10 is then conducted through a passage 58 having a check valve 60 incorporated therein to a passage 62 which opens to the valve bore 48 and to a grooved valve spool pressure port 64. When the spool 46 is shifted leftwardly, the valve spool pressure port 64 connects the pressure passage 62 to the motor port 18 and when shifted rightwardly connects the pressure passage 62 to the motor port 20.

The valve spool 46 is also provided with a plurality of spaced apart transverse return ports 66 and 68. When the valve spool 56 is shifted rightwardly, the transverse ports 66 connect the motor port 18 through the hollow spool portion 54 and transverse ports 56 to the return port 28. When the valve spool 46 is shifted leftwardly, the transverse ports 68 connect the motor port 20 through the hollow spool portion 54 to the transverse ports 56 and the return port 28. The valve spool 46 is biased to the neutral, motor stop position shown by means of a spring 70 placed between retainers 72 and 74, the latter retainer of which abuts shoulders formed on the valve spool and in the valve bore.

For the purpose of holding the valve spool to operating positions on either side of the neutral positions shown, a detent 76 is provided which is adapted to slide into a groove 78 when the valve spool is shifted rightwardly or when shifted to the left of neutral into an open end groove formed near the end of the valve spool which is indicated generally by the numeral 80. The valve body 50 may be provided with an extended portion 82 suitably fastened thereto and in which the detent mechanism and a measuring cylinder to be subsequently explained may be mounted. The extended body portion 82 is provided with a bore 84 axially aligned with the valve spool bore 48 into which an extended portion 86 of the valve spool 46 containing the detent grooves is slidable. The extended portion 86 of the valve spool 46 has a piston guide 85 slidable therein which is provided with a hollow portion 87 and transverse ports 89 leading to the hollow portion.

The body portion 82 is also provided with a stepped bore 88 in which is mounted a slidable sleeve 90 surrounding the detent 76. The lower end of the detent 76 has a flange 92 which is resiliently biased by a spring 93 and the sleeve 90 may be fluid operated downwardly to contact the flange and thus shift the detent from the groove 78 to release the valve spool from one of its operating positions.

The sleeve 90 is provided with a cutaway portion 94 which, together with the walls of the bore 88, forms a chamber 96 which is intersected by a longitudinal passage 98. The passage 98 is in axial alignment with a passage 100 in which a relief valve 102 is mounted. When the relief valve 102 is shifted from a seat 104, pressure fluid is permitted to flow through the passages 100 and 98, to the chamber 96 and directly act on the flange 92 to operate the detent 76 from the groove 80 to release the valve spool from one of its motor operating positions. The relief valve 102 is biased upon the seat 104 by a spring 106 of predetermined resistance. Pressure fluid is admitted to the passage 100 to act on the relief valve 102 by means of a vertical passage 108 connected to the motor port 18. When the valve spool 46 is shifted leftwardly, the valve spool pressure port 64 is connected to the motor port 18, and after the motor 26 is operated to the limit of its stroke in the rightward direction, a pressure increase is created which is transmitted through the vertical passage 108 to the relief valve 102, and then is transmitted through the passages 100 and 98 to the chamber 96 to act on the flange 92 for operating the detent downwardly from the groove 80.

A restricted passage 110 in the flange 92 connects the chamber 96 to a chamber 112 formed in the bottom of the bore 88, and in which the spring 93 is mounted. A tank port 114 is connected to the chamber 112 and in turn is connected to the tank 32 by a conduit 116. The restriction 110 permits a pressure build-up in the chamber 96 for operating the detent flange downwardly and permits reshifting of the flange member.

Means for limiting the stroke of the motor 26 so as to limit the operation of a load device to a preselected position has been provided by a displacement measuring cylinder indicated generally by the numeral 118 formed in the right end of the body portion 82. A piston 120 is reciprocally mounted in the cylinder 118 and is provided with a suitable seal 122. With the piston mounted in the cylinder a measuring chamber 123 is formed the capacity of which is determined by the length of movement of the piston. The operation or stroke of the piston 120 is limited by an abutment member 124 which is threaded into one end of the body portion 82 and which is provided with a handle 126 for manual adjustment of the same. Thus, by limiting the stroke of the piston 120, the measuring capacity of the chamber 123 is determined. Piston 120 is resiliently biased to the position shown by a return spring 128 and the member 85 which is slidable within the hollow portion 54 of the extended portion 86 of the valve spool 46 acts as a guide for the piston 120.

Pressure fluid is admitted to the chamber 123 to act against the piston 120 by means of the hollow portions 54 and 87 of the valve spool 46 and piston guide 85 and the transverse ports 89 in the piston guide 85. When the motor 26 is operated in a leftward directional operation, the displacement from the head end thereof in excess of that returned to the inlet of the pump, said excess being equal to the piston rod displacement, is conducted to the chamber 123 of the cylinder 118 to operate the piston 120. The piston 120 is operated by this excess, or piston rod displacement, until the piston 120 of the cylinder 118 comes into contact with the abutment member 124. At this time there is a pressure increase which is transmitted by a passage 130 which connects the chamber 123 to the upper end of bore 88 in which the detent sleeve 90 is mounted. The sleeve 90 is operated downwardly to contact the flange of the detent and thus operate the detent from the holding groove 78 permitting the spring 70 to shift the main valve spool 46 to the neutral motor stop position.

Provision has been made to take care of any pressure override by constructing transverse porting 132 in the sleeve 90 which normally is closed from communication with a passage 134 leading to the chamber 123. However, upon further pressure increases over and above that necessary to shift the detent sleeve to release the detent from the holding groove, the sleeve ports 132 come into communication with the opening of the passage 134 and fluid is relieved through a vertical passage 136 formed in the detent and which opens to the spring chamber 112. The piston guide member 85 is undercut at 137 in order to provide a passage to the chamber 123 for fluid displaced from the upper end of the detent. For this purpose the detent groove 78 is connected to the undercut portion 137 by a passage 139.

A system relief valve 138 is incorporated in the pump delivery conduit 12 which will relieve excess pressure fluid to the tank 32 by means of a conduit 140.

Assuming for the purposes of clearly describing the operation of the system that the piston rod 44 is linked to a tractor farming implement such as a plow, with the pump in operation and the valve spool in the neutral position shown, the implement will be completely raised when the piston 42 is at the right end limit of its stroke as shown in solid lines. The motor ports 18 and 20 are blocked at the valve spool 46 and the implement will be maintained in the raised position. Displacement from the pump 10 is conducted directly back to the inlet side of the pump by means of delivery conduit 12, pressure port 14 of valve 16, transverse valve spool ports 52, hollow spool portion 54, transverse ports 56, return port 28, and conduit 30. Adjustment of the abutment member 126 of the measuring cylinder 118 will have been made to provide the proper depth control of the farming implement. If the valve spool 46 is manually operated to the right, the spring 93 of the detent mechanism will shift the flange 92 and the detent 76 upwardly and the detent will be shifted into the detent groove 78 in order to hold the valve spool 46 to the motor down operating position. The transverse ports 52 are shifted out of communication with the pressure port 14 and pressure fluid from the pump 10 is then conducted by means of pressure port 14, passage 58, check valve 60, and passage 62 to the pressure port 64 of valve spool 46. Pressure port 64 is now connected to motor port 20 and motor port 18 is connected to the transverse valve spool ports 66. Pressure fluid from pump 10 is then conducted by means of pressure port 64 and motor port 20 to conduit 24 and thence to the right end of motor 26. The piston 42 and piston rod 44 are operated leftwardly to lower the farming implement. Displacement from the head end of the motor is conducted by conduit 22 to motor port 18 and thence by valve spool ports 66, hollow spool portion 54, and transverse valve spool ports 56 to return port 28 from whence it is conducted to the inlet side of pump 10 by means of return conduit 30. As the displacement from the head end of motor 26 is in excess of that entering the rod end, an amount of fluid equal to the rod displacement is conducted through the hollow portion 54 of valve spool 46 and the hollow portion 87 and transverse ports 89 of the piston guide member 85 to the chamber 123 of cylinder 118. The farming implement is operated downwardly into an earth engaging position, the depth of which is controlled by the measuring capacity of chamber 123 as determined by the setting of abutment member 124. Although the measuring chamber 123 and size of the motor 26 as illustrated are out of scale, it will be assumed for the purposes of convenience that the position of the piston 42 of the motor will be as shown in dotted lines when the piston 120 of the cylinder 118 as shown in dotted lines has contacted the abutment member 124. At this stage of the operation, the excess displacement from the motor immediately causes a pressure increase which is transmitted from the chamber 123 by means of passage 130 to the upper end of bore 88 to act against the upper end of the sleeve 90 to overcome the resistance of spring 93 and shift the same downwardly. When the lower end of the sleeve 90 engages the flange 92 of the detent mechanism, the detent 76 is shifted downwardly out of the holding groove 78 and the spring 70 shifts the valve spool 46 to the neutral position shown to stop the motor.

In order to raise the farming implement, the valve spool 46 is manually shifted leftwardly, and the spring 93 shifts the detent 76 upwardly into the holding groove 80. Valve spool pressure port 64 is now connected to the motor port 18 and the transverse valve spool ports 68 are connected to the motor port 20. Pressure fluid from pump 10 is now conducted to the head end of motor 26 by means of conduit 12, pressure port 14, passage 58, check valve 60, and passage 62, to the valve spool pressure port 64 and thence by means of motor port 18 and conduit 22 to the head end of motor 26. Fluid displacement from the rod end of motor 26 is conducted by conduit 24 to the motor port 20 and thence by means of transverse ports 68, hollow spool portion 54, transverse ports 56, return port 28, and conduit 30 to the inlet side of pump 10. Make-up fluid may be drawn from the chamber 123 and if necessary from the tank 32. The control valve spool 46 may be manually operated to stop the motor at any time during this movement, but if the operation is allowed to continue until the piston 42 reaches the limit of its stroke, the pressure build-up then created is transmitted by valve spool pressure port 64 to the motor port 18 and thence by passage 108 to the passage 100 in which relief valve 102 is mounted. The relief valve 102 will be operated against the resistance of spring 106 to open the seat 104 and the passage 100 to the passage 98 and the detent mechanism chamber 96. Pressure transmitted to chamber 96 acts on the detent flange 92 to operate the detent 76 downwardly from the groove 80 and thus permitting the spring 70 to return the valve spool 46 to the neutral motor stop position shown.

The implement may be operated to a lower depth without readjusting the abutment member 124 by manually operating the valve spool to the lowering position and holding the same. Excess fluid displaced from the head end of the motor is conducted to measuring chamber 123 to shift the piston 120 and any excess displacement after the piston is shifted against the abutment is relieved to tank through the detent relief passages. When the desired depth has been reached, the operator may release the valve spool 46 and the spring 93 and detent pressure will return the valve spool to the neutral motor stop position. During the next lowering cycle the implement will return to a depth determined by the setting of the abutment member 124.

Thus it should be noted that there is provided a simple but efficient system for accurately driving a load device to a preselected position. By providing a closed circuit with a double acting differential displacement motor the excess displacement from the head end is utilized by delivering the same to a measuring chamber, the capacity of which determines the stroke length of the motor. When the capacity of the measuring chamber has been reached, detent means are automatically operated or released to cause a directional control valve to be released from a motor operating position to a motor stop position. The measuring capacity of the chamber is easily changed by an adjustable abutment member which permits contraction and expansion of the chamber to a capacity for providing the proper stroke length of the motor.

While the form of embodiment of the invention as herein disclosed constitutes a preferred form, it is to be understood that other forms might be adopted, all coming within the scope of the claims which follow.

What is claimed is as follows:

1. In a closed hydraulic transmission circuit interconnecting a pressure fluid source and a double acting fluid motor of the differential displacement type, a valve for controlling the directional operation of the motor, said valve being resiliently biased to a motor stop position and being operable from the motor stop position for operating the motor in opposite directions, releasable means for holding the valve to one of the motor operating positions wherein the displacement from the motor is the largest, a measuring chamber connected to the motor and having a floating piston therein operable by the excessive displacement from the motor when the valve is operated to the said one position, means for limiting the operation of the piston, and means automatically releasing the valve holding means to return the valve to the motor stop position when the piston has reached the limit of its operation.

2. In a hydraulic power transmission system for operating a load device to a preselected position, the combination of a fluid motor for driving the load device of the differential displacement type, means forming a pressure fluid source for energizing the motor, a closed circuit interconnecting the source and the motor, a directional control valve interconnected in the circuit resiliently biased to a motor stop position and operable to motor operating positions, releasable means for holding the valve to one of the motor operating positions wherein the displacement from the motor is the largest, a measuring chamber connected to the motor and having a floating piston operable by excessive displacement from the motor, adjustable means for limiting the operation of the piston, and means for automatically releasing the valve holding means for stopping the motor when the piston reaches the limit of its operation.

3. In a hydraulic power transmission system for operating a load device to a preselected position, the combination of a fluid motor for driving the load device of the differential displacement type, means forming a pressure fluid source for energizing the motor, a closed circuit interconnecting the source and the motor, a directional control valve interconnected in the circuit including a shiftable member resiliently biased to a motor stop position and operable from the motor stop position for causing operation of the motor in opposite directions, a resiliently loaded detent member holding the shiftable member to one of the motor operating positions wherein the displacement from the motor is the largest, a measuring chamber connected to the motor and having a piston operable by excessive displacement from the motor when the shiftable member is in the said one motor operating position, means for limiting the operation of the piston, and pressure responsive operating means releasing the detent from the holding position when the piston has reached the limit of its operation.

4. In a closed hydraulic transmission circuit interconnecting a pressure fluid source and a double acting fluid motor of the differential displacement type, a valve for controlling the directional operation of the motor, said valve being resiliently biased to a motor stop position and being operable from the motor stop position for operating the motor in opposite directions, releasable detent means for holding the valve to one of the motor operating positions wherein the displacement from the motor is the largest, a measuring chamber connected to the motor and having a floating piston therein operable by the excessive displacement from the motor when the valve is operated to the said one position, means for limiting the operation of the piston, and operating means responsive to increased pressure at the largest displacement end of the motor for releasing the detent to return the valve to the motor stop position when the piston has reached the limit of its operation.

5. In a hydraulic power transmission system having a double acting fluid motor of the differential displacement type for driving a load to a preselected position and means forming a pressure fluid source for driving the motor, a valve for controlling the directional operation of the motor including a shiftable control member resiliently biased to a motor stop position and operable to positions other than neutral for operating the motor in opposite directions, fluid conduits forming a circuit interconnecting the source, a motor and valve and comprising a circuit of the closed type when the motor displacement is largest, a measuring chamber connected to the large displacement end of the motor and having a floating piston operable by the excessive displacement of the motor, resiliently loaded, releasable holding means for maintaining the shiftable control member in the motor operating position wherein the displacement is largest, operating means for the holding means responsive to predetermined pressure increases when the measuring chamber piston has reached the limit of its stroke for releasing the holding means to cause the shiftable member to stop the motor, and adjusting means for limiting the stroke of the measuring chamber piston for preselecting the position to which the load device is to be driven.

6. In a hydraulic power transmission system having a double acting fluid motor of the differential displacement type for driving a load to a preselected position and means forming a pressure fluid source for driving the motor, a valve for controlling the directional operation of the motor including a shiftable control member resiliently biased to a motor stop position and operable to positions other than neutral for operating the motor in opposite directions, fluid conduits forming a circuit interconnecting the source, motor and valve and comprising a circuit of the closed type when the motor displacement is largest, a measuring chamber connected to the large displacement end of the motor and having a floating piston operable by the excessive displacement of the motor, a resiliently loaded detent member for holding the shiftable member to one of the motor operating positions wherein the displacement thereof is largest, operating means for the detent member connected to the largest displacement end of the motor and responsive to predetermined increases of pressure for releasing the detent when the piston of the measuring chamber has reached the limit of its stroke for causing the shiftable control member to stop the motor.

7. A hydraulic power transmission for driving a load device to a preselected position comprising in combination a reversible fluid motor of the differential displacement type for driving the load device, means forming a pressure fluid source for driving the motor, a valve for starting, stopping and controlling the directional operation of the motor hydraulically interconnected between the source and the motor and forming a closed circuit when the motor displacement is largest, said valve including a control member resiliently biased to a neutral motor stop position and shiftable to positions other than neutral for operating the motor in opposite directions, a releasable detent member resiliently loaded to hold the shiftable control member in its motor operating positions, a measuring chamber connected in the closed circuit to receive the excessive displacement of the motor in one direction of its operation, operating means responsive to predetermined pressure increases when the measuring chamber is filled for releasing the detent member and causing the shiftable control member to stop the motor, and means for preselecting the excessive motor displacement capacity of the measuring chamber for preselecting the position to which the load device is to be driven.

8. A hydraulic power transmission for driving a load device to a preselected position comprising in combination a reversible fluid motor of the differential displacement type for driving the load device, means forming a pressure fluid source for driving the motor, a valve for starting, stopping and controlling the directional operation of the motor hydraulically interconnected between the source and the motor and forming a closed circuit when the motor displacement is largest, said valve including a control member resiliently biased to a neutral motor stop position and shiftable to positions other than neutral for operating the motor in opposite directions, a releasable detent member resiliently loaded to hold the shiftable control member in its motor operating positions, a measuring chamber connected to the largest displacement end of the motor and having a floating piston operable by the excessive displacement of the motor in one direction of its operation, fluid operating means for releasing the detent also hydraulically connected to the largest displacement end of the motor and responsive to release the detent when the floating piston has reached the end of its stroke, and adjustable means for limiting the stroke of the piston for preselecting the position to which the load device is to be driven.

References Cited in the file of this patent
UNITED STATES PATENTS 2,276,979  Jacobi _____ Mar. 17, 1942